Patented Jan. 19, 1943

2,309,023

UNITED STATES PATENT OFFICE 2,309,023

SHOE STIFFENER

Adelbert P. Swett, Westwood, Mass., assignor to Beckwith Manufacturing Company, Dover, N. H., a corporation of New Hampshire No Drawing. Application August 2, 1940, Serial No. 350,096

6 Claims. (Cl. 36—77)

My invention consists in improvements in the manufacture of thermoplastic shoe stiffeners or box toes employed in shoemaking, and more particularly in an improved thermoplastic compound for impregnating the foundation fabric of such articles.

Impregnants for shoe stiffeners heretofore used, such as natural resins and vegetable and mineral waxes, often have poor ageing qualities, principally due to oxidation at normal temperatures, and tend to crumble and deteriorate in long continued use. The physical incompatibility of the ingredients also often accounts for the poor ageing qualities found with such impregnants. Further, many of the thermoplastic types of shoe stiffeners heretofore used display a relatively narrow softening range. That is to say, the impregnant hardens rapidly after the stiffener is removed from the heater. The result is that the lasting operation must be hurriedly carried out so that the stiffener will not become rigid before the lasting has been accomplished.

Accordingly, one object of my invention is to provide an impregnant suitable for use in a shoe stiffener which will exhibit good ageing qualities and which will harden after its removal from the heater in an appreciable interval of time convenient for the shoe maker.

Another object of my invention is to provide a stiffener which will soften at a relatively high temperature but exhibit hysteresis or supercooling after the source of heat is removed, that is to say, the stiffener does not become rigid until considerable heat has been lost, thus inducing a time lag within which the lasting operation may be unhurriedly carried out.

I have discovered that coumarone indene resin or a paracoumarone resin may be compatibly blended with a wax and rubber to form an impregnant for a stiffener which will age well and which has a wide softening-hardening or rehardening range. Such a resin may be described as a polymerization product of coal tar light oil residue.

To the light oil produced in the destructive distillation of coke, sulphuric acid is added, the mixture is agitated, and a neutralizing charge of sodium or calcium hydroxide is added. The treated oil is then cracked, giving off benzol, toluol, and xylol. The residue is heated at elevated temperatures, the time and elevation of the temperature being selected according to the degree of polymerization desired. For best results the polymerization should be discontinued at the point where the resulting resin has a melting point in the range 196°–208° F. The final product of the foregoing treatment is a paracoumarone indene resin sold under the name "Nuba," and specifically "Nuba No. 1," "Nuba No. 2" or "Nuba No. 3." The average Nuba characteristics are given by the manufacturer as follows:

|  | Nuba No. 1 | Nuba No. 2 | Nuba No. 3 |
|---|---|---|---|
| Melting point range ......°C.. | 80-95 | 100-125 | 135-150 |
| Color.......................... | 17-19 | 19-21 | 20-22 |
| Insoluble in petroleum benzine.................percent.. | 8 | 33 | 45 |
| Insoluble in benzol......do.... | 6 | 14 | 18 |
| Ash.......................do.... | 18 | 18 | 27 |
| Fracture....................... | Grainy | Grainy | Grainy |
| Form........................... | Solid | Solid | Solid |

Nuba is dark brown, tough, elastic and completely compatible with colophony, most vegetable and mineral waxes, and with either normal or vulcanized rubber. With these waxes and gums Nuba apparently makes solid solutions analogous to that of pyroxylin and camphor gum.

In its relation to shoe stiffeners paracoumarone indene resin, specifically Nuba, has other valuable characteristics. In the first place the resin has a very wide softening-hardening range. After the resin has been heated and softened, there is a considerable time lag before it hardens again, and this increased time is important because the laster is able to make the nice adjustments and corrections necessarily attendant upon superlative shoemaking. By using Nuba as the dominant ingredient of my impregnant for example, between 35% and 55% Nuba, I am able to make a stiffener having a greater specific gravity and density than it has heretofore been practicable to produce commercially, thus approaching the consistency of high grade leather in my improved stiffener. The increase in density may amount to approximately 12% over the density of commercial stiffeners heretofore on the market.

Polymerization of the light oil residue after pretreatment with sulphuric acid results in a resin having an ash content of approximately 18%, largely composed of calcium sulphate, sodium sulphate, sodium sulphide, and some sodium hydroxide. The ash content of the resin used as a dominant or modifying ingredient of the impregnant gives the product a relatively high water absorption characteristic, preventing extreme loss of atmospheric moisture in dry weather and promoting easy softening by the moist heat or steam generally employed in shoemaking.

Further, I have discovered that by blending paracoumarone resin or coumarone indene resin with candelilla, or other common, easily obtainable waxes, I can obtain a desirable equivalent or substitute for montan wax, desirable not only because the equivalent displays the good qualities of montan wax, but because it exhibits important advantages over montan, for example, better ageing qualities, wider hardening-softening range, increased density, and greater water absorption. The preferable proportions of the blend are approximately forty-five parts of Nuba to ten parts of candelilla wax. Other waxes such as carnauba wax, beeswax, japan wax, amorphous or normal petroleum waxes, or insect waxes such as shellac wax may be used. Although I cannot say exactly why a blend of Nuba and a wax of the above types is analogous to montan wax, it may be because montan wax is a derivative or extract of partially completed geologic coal, and Nuba is a polymer of a coal-pitch residue to which I add a wax or waxy ingredient.

Although there are numerous formulae by which the improved impregnant of my invention may be made, as will be apparent to those skilled in the art, I prefer the following formula:

| | Per cent by weight |
|---|---|
| Nuba (paracoumarone or coumarone indene resin) | 45 |
| Rosin (colophony) | 30 |
| Rubber (vulcanized scrap) | 15 |
| Candelilla wax | 10 |

The above ingredients are carefully weighed out in a common vessel, heated to about 370° F. and simultaneously agitated. The result is a homogeneous, molten, water-free, impregnant, of a viscosity suitable for the saturation of a wide range of bibulous fabrics or fibrous bases such as felt, paper, textiles, and the like. The impregnation or saturation of the stiffener base by the molten mixture may be carried out by any of the commonly used methods and the stiffened sheet material thus produced may be cut up into box toe blanks or other shoe stiffeners of the desired shape.

A shoe stiffener made according to my invention is used in shoemaking in the conventional manner; that is to say, the operator inserts a stiffener between the upper and lining of a shoe and puts the shoe in a heater to which moist heat is supplied. The stiffener is thus rendered limp and plastic, and the operator then inserts the prepared shoe in the pulling over machine and carries out the pulling over operation. When the pulled-over shoe reaches the toe laster, it is inserted in another heater and the stiffener again softened and rendered limp. Due to the wide softening-hardening range of the impregnant, the toe laster has plenty of time to work the toe of the upper over the last, remove wrinkles, and fasten the overlasted margin to the insole. Throughout the lasting operation the stiffener loses heat but does not become hard and unworkable until it has cooled for some minutes on the last when it finally becomes hard and substantially rigid in the shape of the last.

A shoe stiffener manufactured according to my invention is desirable not only from the standpoint of a shoe manufacturer, but also from the point of view of the purchaser of the shoes. The wide softening-hardening range facilitates the work of the laster, giving him more time in which to work the upper over the last and secure it in lasted position. After the shoe has been manufactured it will preserve its lines because the stiffener has good ageing qualities and holds its shape indefinitely, even in warm humid weather.

Having now described my invention in detail and given one formula by which the invention may be practiced, what I claim as new and desire to secure by Letters Patent of the United States is:

1. A shoe stiffener comprising a bibulous foundation fabric impregnated with a water-free thermoplastic compound including rubber, wax, colophony, and as a dominant ingredient, coumarone indene resin; the impregnation imparting to the stiffener the property of hysteresis in hardening after having been softened by heat.

2. A shoe stiffener comprising bibulous foundation fabric impregnated with a water-free thermoplastic compound including rubber, wax, and, as a dominant element, Nuba.

3. A shoe stiffener comprising a sheet felt foundation impregnated with a water-free thermoplastic compound including rubber, wax and, as a dominant ingredient, a dark colored coumarone-indene resin having a melting point range of 80–95° C. and an ash content of about 18%.

4. A shoe stiffener comprising a sheet felt foundation impregnated with a water-free thermoplastic compound including rubber, wax and, as a dominant ingredient, a dark colored coumarone-indene resin having a melting point range of 100–125° C. and an ash content of about 18%.

5. A shoe stiffener comprising a sheet felt foundation impregnated with a water-free thermoplastic compound including rubber, wax, and a dark colored coumarone-indene resin in quantity approximately 45% of the compound, said resin having a melting point range of 135–150° C. and an ash content of about 27%.

6. A shoe stiffener comprising a bibulous foundation fabric impregnated with a water-free thermoplastic compound including approximately 45% of a dark colored coumarone-indene resin having a melting point range of 80–150° C. and an ash content of 18–27%, 30% rosin, 15% vulcanized rubber and 10% candelilla wax, the said impregnant imparting to the stiffener a substantial softening-hardening time lag and a substantial water-absorption characteristic.

ADELBERT P. SWETT.